(12) United States Patent
Vijayvargiya (10) Patent No.: US 11,659,051 B1
(45) Date of Patent: *May 23, 2023

(54) SYSTEMS AND METHODS FOR CONSISTENTLY APPLYING RULES TO MESSAGES

(71) Applicant: Veritas Technologies LLC, Santa Clara, CA (US)

(72) Inventor: Rashmi Vijayvargiya, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 16/774,585

(22) Filed: Jan. 28, 2020

Related U.S. Application Data (63) Continuation of application No. 15/248,835, filed on Aug. 26, 2016, now Pat. No. 10,609,184.

(51) Int. Cl.
*H04L 67/00* (2022.01)
*H04L 67/306* (2022.01)
*H04L 51/04* (2022.01)
*H04L 51/216* (2022.01)

(52) U.S. Cl.
CPC .............. *H04L 67/34* (2013.01); *H04L 51/04* (2013.01); *H04L 51/216* (2022.05); *H04L 67/306* (2013.01)

(58) Field of Classification Search
CPC ...................................................... H04L 51/12
See application file for complete search history.

(56) References Cited

U.S. PATENT DOCUMENTS

| 8,620,869 | B2* | 12/2013 | Consul ................. G06Q 10/107 707/662 |
| 8,930,464 | B1* | 1/2015 | Mace ................... G06Q 10/107 709/202 |
| 9,235,641 | B1* | 1/2016 | Kumar .................. G06F 16/951 |
| 10,783,498 | B2* | 9/2020 | Aboel-Nil ............ G06Q 10/107 |
| 2003/0046309 | A1 | 3/2003 | McGrath et al. |
| 2008/0250084 | A1* | 10/2008 | Polimeni ................. H04L 51/42 |

(Continued)

OTHER PUBLICATIONS

Non-Final Office Action received for U.S. Appl. No. 15/248,835 dated Jun. 1, 2018, 29 pages.

(Continued)

*Primary Examiner* — Nicholas R Taylor
*Assistant Examiner* — Sm Z Islam
(74) *Attorney, Agent, or Firm* — Greenberg Traurig, LLP (57) ABSTRACT

The disclosed computer-implemented method for consistently applying rules to messages may include (i) identifying a user account on a message server that comprises both unarchived messages to which message rules are applied by default and archived messages to which the message rules are not applied by default, (ii) detecting a new message rule that specifies an action to be performed on relevant messages within the user account on the message server, (iii) locating at least one archived message within the user account on the message server to which the new message rule applies, and (iv) applying the new message rule to the at least one archived message by performing the specified action on the at least one archived message. Various other methods, systems, and computer-readable media are also disclosed.

18 Claims, 4 Drawing Sheets

(56) References Cited

U.S. PATENT DOCUMENTS

| | | |
|---|---|---|
| 2010/0235449 A1 | 9/2010 | Eggers, Jr. et al. |
| 2013/0054613 A1* | 2/2013 | Bishop .................... G06F 16/93 |
| | | 707/E17.046 |
| 2013/0070753 A1 | 3/2013 | Sahni et al. |
| 2013/0191759 A1* | 7/2013 | Bhogal .................... G06F 3/048 |
| | | 715/752 |
| 2014/0306833 A1 | 10/2014 | Ricci |
| 2017/0193389 A1* | 7/2017 | Thomas ................. G06N 20/00 |

OTHER PUBLICATIONS

Final Office Action received for U.S. Appl. No. 15/248,835 dated Jan. 25, 2019, 30 pages.

Non-Final Office Action received for U.S. Appl. No. 15/248,835 dated May 2, 2019, 37 pages.

Notice of Allowance received for U.S. Appl. No. 15/248,835 dated Dec. 2, 2019, 27 pages.

Enterprise Vault; https://www.veritas.com/product/informationgovernance/enterprise-vault, accessed Jul. 21, 2016; Veritas, Nov. 17, 2015, pp. 1-3.

FSRM and FCI: Frequently Asked Questions; https://technet.microsoft.com/enus/library/ee344836(v=ws.I0).aspx, accessed Jul. 21, 2016; Microsoft, Feb. 27, 2011. pp. 1-6.

* cited by examiner

SYSTEMS AND METHODS FOR CONSISTENTLY APPLYING RULES TO MESSAGES

CROSS REFERENCE TO RELATED APPLICATION

This application is a continuation of U.S. application Ser. No. 15/248,835, filed Aug. 26, 2016, the disclosure of which is incorporated, in its entirety, by this reference.

BACKGROUND

Email and other forms of electronic messaging have grown from a novelty to a convenience to a mainstay of personal and business communication. Emails may contain trivial information that is quickly deleted or they may contain important information that a user wishes to reference in the future. The growing popularity of the latter type of email has led many email hosting services to allow users to archive messages rather than deleting them, removing the messages from the user's inbox but preserving them for later reading. Many email hosting services may make the task of finding relevant emails easier by allowing users to categorize emails with tags, folders, and other such mechanisms. Users may then later search through folders for tagged messages in order to find the message they are looking for. Some email clients and services may also provide users with the ability to create automated rules that categorize emails by folder or tag.

However, traditional systems for allowing users to categorize emails with automated rules may only apply the rules to emails currently in the user's inbox. Any message in other folders, including archived messages, may not be subject to the rules, causing the user frustration when they later search for categorized messages and receive inconsistent results. The instant disclosure, therefore, identifies and addresses a need for systems and methods for consistently applying rules to messages.

SUMMARY

As will be described in greater detail below, the instant disclosure describes various systems and methods for consistently applying rules to messages by detecting when a new rule has been created and applying the new rule to archived messages to which the new rule would otherwise not apply.

In one example, a computer-implemented method for consistently applying rules to messages may include (i) identifying a user account on a message server that includes both unarchived messages to which message rules are applied by default and archived messages to which the message rules are not applied by default, (ii) detecting a new message rule that specifies an action to be performed on relevant messages within the user account on the message server, (iii) locating at least one archived message within the user account on the message server to which the new message rule applies, and (iv) applying the new message rule to the at least one archived message by performing the specified action on the at least one archived message.

In some embodiments, detecting the new message rule may include determining that a user has specified that the new message rule be applied to the archived messages. In some examples, detecting the new message rule may include detecting that a user has configured the new message rule for the user account. Additionally or alternatively, detecting the new message rule may include determining that the new message rule may include a type of message rule that is able to be applied to the archived messages.

In one embodiment, applying the new message rule to the archived message may include transforming the new message rule into a classification rule that is supported by a file system on the message server. In some examples, applying the new message rule to the archived message may include detecting that the message server is performing a synchronization operation on the user account that synchronizes new data with stored data on the message server and applying the new message rule during the synchronization operation.

In some examples, performing the specified action on the archived message may include moving the archived message to a specified folder. In one example, the computer-implemented method may further include receiving a search query for messages in the specified folder and returning the archived message as a search result for the search query.

In other examples, performing the specified action on the archived message may include tagging the archived message with a specified tag. In one example, the computer-implemented method may further include receiving a search query for messages with the specified tag and returning the archived message as a search result for the search query.

In one embodiment, identifying the user account on the message server that includes both the unarchived messages and the archived messages may include identifying the user account on a message server that stores unarchived messages but not archived messages and identifying the user account on an archive message server that stores archived messages but not unarchived messages.

In one embodiment, a system for implementing the above-described method may include (i) an identification module, stored in memory, that identifies a user account on a message server that includes both unarchived messages to which message rules are applied by default and archived messages to which the message rules are not applied by default, (ii) a detection module, stored in memory, that detects a new message rule that specifies an action to be performed on relevant messages within the user account on the message server, (iii) a location module, stored in memory, that locates at least one archived message within the user account on the message server to which the new message rule applies, (iv) an applying module, stored in memory, that applies the new message rule to the at least one archived message by performing the specified action on the at least one archived message, and (v) at least one physical processor configured to execute the identification module, the detection module, the location module, and the applying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a user account on a message server that includes both unarchived messages to which message rules are applied by default and archived messages to which the message rules are not applied by default, (ii) detect a new message rule that specifies an action to be performed on relevant messages within the user account on the message server, (iii) locate at least one archived message within the user account on the message server to which the new message rule applies, and (iv) apply the new message rule to the at least one archived message by performing the specified action on the at least one archived message.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for consistently applying rules to messages. As will be explained in greater detail below, by detecting when new message rules are added and applying the new rules to archived messages, the systems and methods described herein may maintain consistency throughout a user's messages and enable the user to more easily search through current and archived messages to obtain the desired search results. Moreover, the systems and methods described herein may improve the functioning of an email server by keeping message rules consistent between the email client and the email server, enabling searches run on stored emails to return expected results.

Figure 1:
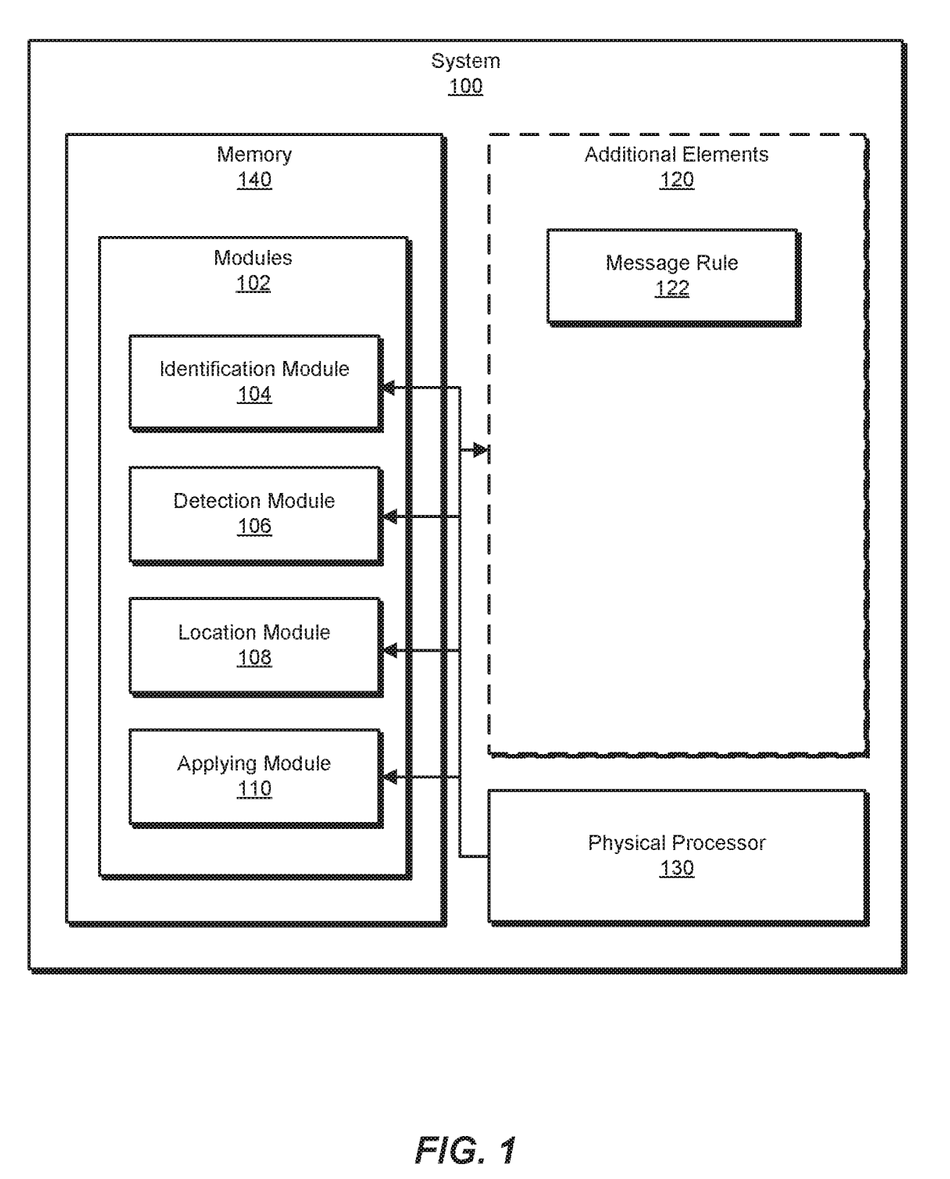
FIG. 1 is a block diagram of an example system for consistently applying rules to messages.
Figure 2:
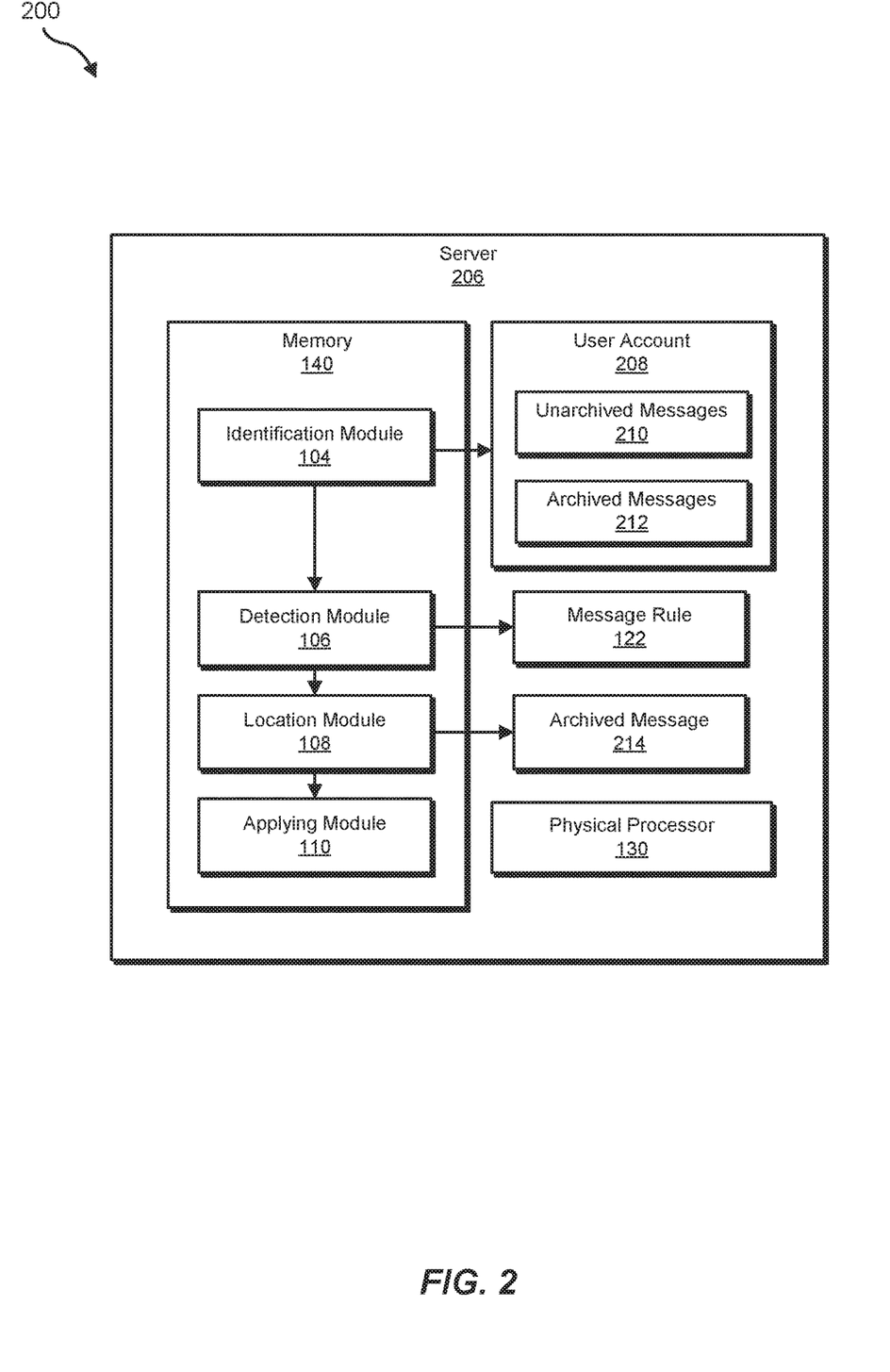
FIG. 2 is a block diagram of an additional example system for consistently applying rules to messages.
Figure 3:
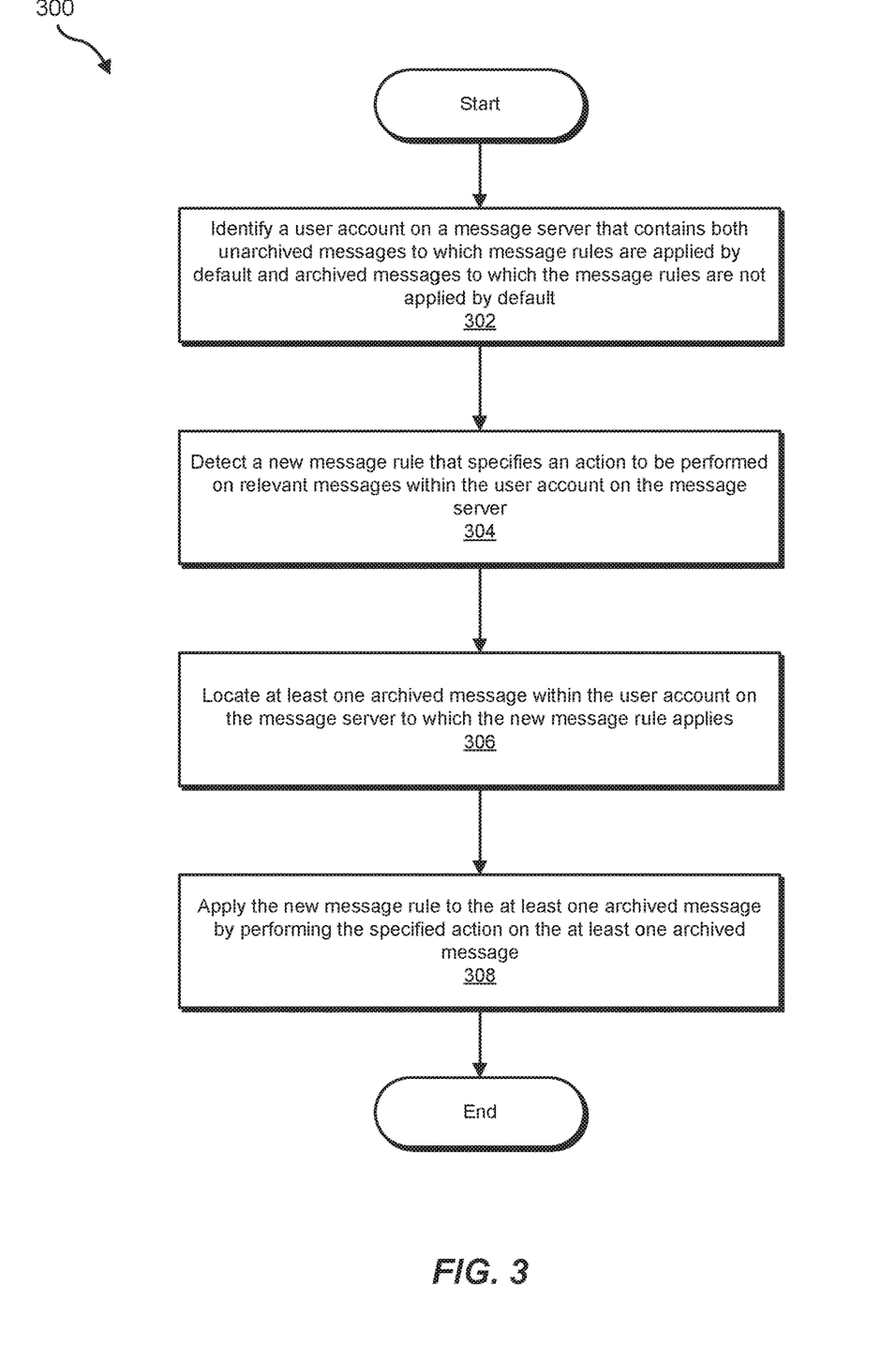
FIG. 3 is a flow diagram of an example method for consistently applying rules to messages.
Figure 4:
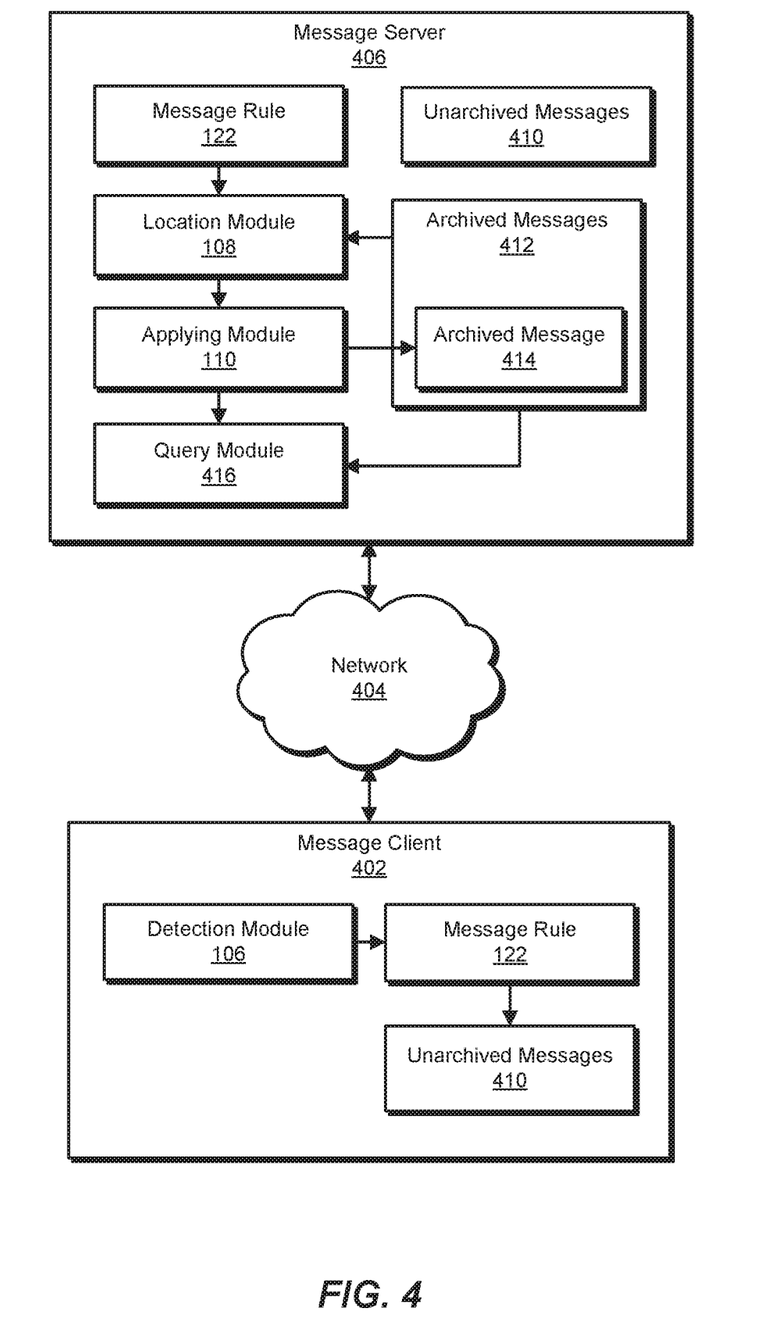
FIG. 4 is a block diagram of an example computing system for consistently applying rules to messages.

The following will provide, with reference to FIGS. 1, 2, and 4, detailed descriptions of example systems for consistently applying rules to messages. Detailed descriptions of corresponding computer-implemented methods will also be provided in connection with FIG. 3.

FIG. 1 is a block diagram of example system 100 for consistently applying rules to messages. As illustrated in this figure, example system 100 may include one or more modules 102 for performing one or more tasks. For example, and as will be explained in greater detail below, example system 100 may include an identification module 104 that identifies a user account on a message server that includes both unarchived messages to which message rules are applied by default and archived messages to which the message rules are not applied by default. Example system 100 may additionally include a detection module 106 that detects a new message rule that specifies an action to be performed on relevant messages within the user account on the message server. Example system 100 may also include a location module 108 that locates at least one archived message within the user account on the message server to which the new message rule applies. Example system 100 may additionally include an applying module 110 that applies the new message rule to the at least one archived message by performing the specified action on the at least one archived message. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as server 206 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate consistently applying rules to messages. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as message rule 122. Message rule 122 generally represents any type or form of rule specifying one or more actions to be performed on messages that meet one or more predefined criteria. Examples of message rule 122 include, without limitation, moving, deleting, marking as read, removing attachments from, saving attachments from, forwarding, tagging, marking as having a certain importance level, and/or otherwise categorizing any message with a certain characteristic including but not limited to containing one or more keywords in the subject and/or title, having attachments, not having attachments, being from a certain sender, being directed to a certain recipient, and/or having a certain format.

Example system 100 in FIG. 1 may be implemented in a variety of ways. For example, all or a portion of example system 100 may represent portions of example system 200 in FIG. 2. As shown in FIG. 2, system 200 may include a server 206. In one example, all or a portion of the functionality of modules 102 may be performed by server 206 and/or any other suitable computing system. As will be described in greater detail below, one or more of modules 102 from FIG. 1 may, when executed by at least one processor of server 206, enable server 206 to consistently apply rules to messages.

Server 206 generally represents any type or form of computing device that is capable of storing messages. In one embodiment, server 206 may include an email server, such as a MICROSOFT EXCHANGE server. In some embodiments, server 206 may represent a message server that stores unarchived messages and/or an archive message server that stores archived messages. For example, server 206 may include a VERITAS ENTERPRISE VAULT archive message server. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another. For example, server 206 may represent both a message server and an archived message server.

User account 208 generally represents any type or form of structure that allows a user access to messages sent to/and or from one or more account addresses. Examples of user account 208 include, without limitation, an email account, a social media account, and/or any other type of messaging service account. Archived messages 212 generally represent any messages that are stored on a messaging server but not displayed by default in a user's messaging client and/or browser window. In some embodiments, archived messages 212 may be archived manually by the user. Additionally or alternatively, archived messages 212 may be archived automatically by the messaging service after a period of time and/or according to a messaging rule. In some embodiments, any messages not in a user's inbox may be archived messages. In other embodiments, a user may have one or more active folders with messages that are neither archived nor in the inbox. Unarchived messages 210 generally represent any type of messages that are not archived.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for consistently applying rules to messages. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a user account on a message server that may include both unarchived messages to which message rules are applied by default and archived messages to which the message rules are not applied by default. For example, identification module 104 may, as part of server 206 in FIG. 2, identify user account 208 on server 206 that includes both unarchived messages 210 to which message rules are applied by default and archived messages 212 to which the message rules are not applied by default.

The term "message," as used herein, generally refers to any type of electronic communication. In some embodiments, a message may be an email. Additionally or alternatively, a message may include a message sent via a social media platform and/or any other type of service that delivers electronic messages.

Identification module 104 may identify a user account on a message server in a variety of contexts. In one embodiment, identification module 104 may be part of an add-in in a messaging client that communicates with the messaging server. In another embodiment, identification module 104 may be hosted on the messaging server.

In some embodiments, identification module 104 may identify the user account on the message server by identifying the user account on both a message server that stores unarchived messages but not archived messages and on an archive message server that stores archived messages but not unarchived messages. In one embodiment, message rules may be applied to the message server by default but may not be applied to the archive message server by default.

At step 304, one or more of the systems described herein may detect a new message rule that specifies an action to be performed on relevant messages within the user account on the message server. For example, detection module 106 may, as part of server 206 in FIG. 2, detect a message rule 122 that specifies an action to be performed on relevant messages within user account 208 on server 206.

The term "action," as used herein, generally refers to any type of change that may be applied to a message. Examples of an action include, without limitation, moving, deleting, marking as read, removing attachments from, saving attachments from, forwarding, tagging, and/or marking as having a certain importance level.

Detection module 106 may detect a new message rule in a variety of ways. For example, detection module 106 may monitor actions taken by a messaging client in order to detect new message rules. In another embodiment, detection module 106 may be part of an interface for creating new message rules. In some examples, detection module 106 may detect that a user has configured the new message rule for the user account.

In some embodiments, detection module 106 may detect the new message rule by determining that a user has specified that the new message rule be applied to the archived messages. For example, the interface for creating new message rules may have a checkbox and/or other element that a user can use to specify that the new rule be applied to archived messages. In other embodiments, a user may use a separate dialog, widget, and/or add-in to specify that a message rule be applied to archived messages. In some examples, detection module 106 may detect a message rule that is not new but which a user has only now specified should be applied to archived messages.

In some examples, detection module 106 may determine that the new message rule includes a type of message rule that is able to be applied to the archived messages. In some embodiments, the systems described herein may include a list of types of message rules that may be applied to archived messages and/or a list of types of message rules that may not be applied to archived messages. For example, a message rule that adds a tag to messages from a certain sender may be able to be applied to archived messages, while a message rule that archives and/or forwards all messages containing a certain keyword may not be able to be applied to archived messages.

At step 306, one or more of the systems described herein may locate at least one archived message within the user account on the message server to which the new message rule applies. For example, location module 108 may, as part of server 206 in FIG. 2, locate archived message 214 within user account 208 on server 206 to which message rule 122 applies.

Location module 108 may locate the archived message or messages to which the rule applies in a variety of ways. For example, location module 108 may perform a search on all archived messages in the user account using a query based on the message rule. In some embodiments, location module 108 may use a built-in search function of the file system to locate the messages to which the new rule applies.

At step 308, one or more of the systems described herein may apply the new message rule to the at least one archived message by performing the specified action on the at least one archived message. For example, applying module 110 may, as part of server 206 in FIG. 2, apply message rule 122 to archived message 214 by performing the specified action on archived message 214.

Applying module 110 may apply the new rule in a variety of ways. In some embodiments, applying module 110 may apply the new message rule to the at least one archived message by transforming the new message rule into a classification rule that is supported by a file system on the message server. In one embodiment, applying module 110 may transform an email server rule into a classification rule implemented natively by the WINDOWS operating system. In some embodiments, applying module 110 may use metadata tags associated with the message server rule to transform the message server rule into the classification rule.

In some embodiments, applying module 110 may apply the new message rule to the archived message by detecting that the message server is performing a synchronization operation on the user account that synchronizes new data with stored data on the message server and then applying the new message rule during the synchronization operation. In one embodiment, applying module 110 may wait to apply new rules to archived messages until a synchronization operation is occurring. In some embodiments, applying module 110 may set a flag in the data associated with the synchronization operation in order to inform the message server that a new rule is ready to be applied to archived messages.

In some examples, applying module 110 may perform the specified action on the archived message by moving the archived message to a specified folder. In these examples, the systems described herein may later receive a search query for messages in the specified folder and may return the archived message as a search result for the search query. Additionally or alternatively, applying module 110 may perform the specified action on the archived message by tagging the at least one archived message with a specified tag. In some examples, the systems described herein may then receive a search query for messages with the specified tag and may return the archived message as a search result for the search query.

In some embodiments, the systems described herein may be hosted partially on a message client and partially on a messaging server. For example, as illustrated in FIG. 4, a message client 402 may communicate with a message server 406 via a network 404. Message client 402 may represent any type of application and/or web page on a user's device that enables the user to read messages. In some examples, detection module 106 on message client 402 may detect message rule 122 that is automatically applied to unarchived messages 410. The systems described herein may send message rule 122 to message server 406, in some examples as part of a synchronization operation between message client 402 and message server 406. Location module 108 on message server 406 may search archived messages 412 for an archived message 414 to which message rule 122 applies. Applying module 110 may then apply message rule 122 to archived message 414, for example by tagging archived message 414 and/or moving archived message 414 to another folder within the archive. In some examples, a query module 416 may receive a query for which archived message 414 is a valid result and may return archived message 414 as a result for the query. In some examples, archived message 414 may not have been a valid result for the query if message rule 122 were not applied to archived message 414. For example, if archived message 414 included the phrase "malicious toaster" but was not originally tagged with any tags, and message rule 122 specified that all messages with the keyword "malicious toaster" be tagged with the tag "appliance security," a user submitted a query for messages with the "appliance security" tag would not have returned archived message 414 as a result for the query had the systems described herein not applied message rule 122 to archived message 414.

As described in connection with method 300 above, the systems and methods described herein may consistently categorize messages by reclassifying archived data based on new message rules. In some examples, the systems described herein may detect message rules that are not currently applied to archived data and may apply those message rules to archived messages. In other examples, the systems described herein may provide a user with an option to apply new message rules to archived messages. The systems described herein may then transform the message rules used by the message client and/or message server into classification rules that are applied efficiently by the message server's operating system and may apply those rules to archived messages. By applying message rules not just to current messages but also to archived messages, the systems and methods described herein may ensure that queries run on both archived and unarchived messages return consistent and expected results.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for consistently applying rules to messages, at least a portion of the method being performed by a computing device comprising at least one processor, the method comprising:
   identifying a user account on a message server that comprises unarchived messages to which message rules are applied by default and on an archive message server that comprises archived messages to which the message rules are not applied by default;
   detecting a new message rule that specifies an action to be performed on relevant messages within the user account on the message server, wherein the new message rule comprises a message rule that is not new and that is presently specified for application to the archived messages, the message rule comprising tagging the archived messages with a search tag utilized to search for messages from a specified sender;
   locating at least one archived message within the user account on the archive message server to which the new message rule applies; and
   applying the new message rule to the at least one archived message by performing the specified action on the at least one archived message, wherein applying the new message rule to the at least one archived message comprises transforming, utilizing metadata tags, the new message rule into a classification rule that is supported by a file system on the message server, wherein the new message rule is an email server rule, wherein the classification rule is implemented natively by an operating system running on the computing device.

2. The computer-implemented method of claim 1, wherein applying the new message rule to the at least one archived message comprises transforming the new message rule into a classification rule that is supported by a file system on the message server.

3. The computer-implemented method of claim 1, wherein detecting the new message rule comprises detecting that a user has configured the new message rule for the user account.

4. The computer-implemented method of claim 1, wherein applying the new message rule to the at least one archived message further comprises:
    detecting that the archive message server is performing a synchronization operation on the user account that synchronizes new data with stored data on the archive message server; and
    applying the new message rule during the synchronization operation.

5. The computer-implemented method of claim 1, wherein detecting the new message rule comprises determining that the new message rule comprises a type of message rule that is able to be applied to the archived messages.

6. The computer-implemented method of claim 1, wherein performing the specified action on the at least one archived message comprises moving the at least one archived message to a specified folder.

7. The computer-implemented method of claim 6, further comprising:
    receiving a search query for messages in the specified folder; and
    returning the at least one archived message as a search result for the search query.

8. The computer-implemented method of claim 1, wherein performing the specified action on the at least one archived message comprises tagging the at least one archived message with the search tag.

9. The computer-implemented method of claim 8, further comprising:
    receiving a search query for messages with the search tag; and
    returning the at least one archived message as a search result for the search query.

10. The computer-implemented method of claim 1, wherein identifying the user account on the message server that comprises unarchived messages and on the archive message server that comprises the archived messages comprises:
    identifying the user account on the message server that stores the unarchived messages and not the archived messages; and
    identifying the user account on the archive message server that stores the archived messages and not the unarchived messages.

11. A system for consistently applying rules to messages, the system comprising:
    an identification module, stored in memory, that identifies a user account on a message server that comprises unarchived messages to which message rules are applied by default and on an archive message server that comprises archived messages to which the message rules are not applied by default;
    a detection module, stored in memory, that detects a new message rule that specifies an action to be performed on relevant messages within the user account on the message server, wherein the new message rule comprises a message rule that is not new and that is presently specified for application to the archived messages, the message rule comprising tagging the archived messages with a search tag utilized to search for messages from a specified sender, wherein the search tag comprises a keyword corresponding to a phrase included in the archived messages;
    a location module, stored in memory, that locates at least one archived message within the user account on the archive message server to which the new message rule applies;
    an applying module, stored in memory, that applies the new message rule to the at least one archived message by performing the specified action on the at least one archived message, wherein the new message rule is applied to the at least one archived message by transforming, utilizing metadata tags, the new message rule into a classification rule that is supported by a file system on the message server, wherein the new message rule is an email server rule, wherein the classification rule is implemented natively by an operating system running on a computing device; and
    at least one physical processor configured to execute the identification module, the detection module, the location module, and the applying module.

12. The system of claim 11, wherein the applying module applies the new message rule to the at least one archived message by transforming the new message rule into a classification rule that is supported by a file system on the message server.

13. The system of claim 11, wherein the detection module detects the new message rule by detecting that a user has configured the new message rule for the user account.

14. The system of claim 11, wherein the applying module further applies the new message rule to the at least one archived message by:
    detecting that the archive message server is performing a synchronization operation on the user account that synchronizes new data with stored data on the archive message server; and
    applying the new message rule during the synchronization operation.

15. The system of claim 11, wherein the detection module detects the new message rule by determining that the new message rule comprises a type of message rule that is able to be applied to the archived messages.

16. The system of claim 11, wherein the applying module performs the specified action on the at least one archived message by moving the at least one archived message to a specified folder.

17. The system of claim 16, further comprising a query module, stored in memory, that:
    receives a search query for messages in the specified folder; and
    returns the at least one archived message as a search result for the search query.

18. A non-transitory computer-readable medium comprising one or more computer-readable instructions that, when executed by at least one processor of a computing device, cause the computing device to:

identify a user account on a message server that comprises unarchived messages to which message rules are applied by default and on an archive message server that comprises archived messages to which the message rules are not applied by default;

detect a new message rule that specifies an action to be performed on relevant messages within the user account on the message server, wherein the new message rule comprises a message rule that is not new and that is presently specified for application to the archived messages, the message rule comprising tagging the archived messages with a search tag utilized to search for messages from a specified sender;

locate at least one archived message within the user account on the archive message server to which the new message rule applies; and apply the new message rule to the at least one archived message by performing the specified action on the at least one archived message, wherein the new message rule is applied to the at least one archived message by transforming, utilizing metadata tags, the new message rule into a classification rule that is supported by a file system on the message server, wherein the new message rule is an email server rule, wherein the classification rule is implemented natively by an operating system running on the computing device.

* * * * *